Sept. 15, 1936. F. SHORT 2,054,101
METHOD OF AND APPARATUS FOR MAKING ICE
Filed May 23, 1930 4 Sheets-Sheet 2

Fig. 2.

FRANK SHORT
INVENTOR
BY Janney, Blair & Curtis
ATTORNEYS

Sept. 15, 1936.    F. SHORT    2,054,101
METHOD OF AND APPARATUS FOR MAKING ICE
Filed May 23, 1930    4 Sheets-Sheet 3

FRANK SHORT
INVENTOR

BY Janney, Blair & Curtis
ATTORNEYS

Sept. 15, 1936.   F. SHORT   2,054,101
METHOD OF AND APPARATUS FOR MAKING ICE
Filed May 23, 1930    4 Sheets-Sheet 4

FRANK SHORT
INVENTOR

BY Janney, Blair & Curtis
ATTORNEYS

Patented Sept. 15, 1936

2,054,101

UNITED STATES PATENT OFFICE 2,054,101

METHOD OF AND APPARATUS FOR MAKING ICE

Frank Short, Newark, N. J., assignor, by mesne assignments, to Flakice Corporation, Wilmington, Del., a corporation of Delaware Application May 23, 1930, Serial No. 454,963

38 Claims. (Cl. 62—105)

This invention relates to the art of refrigeration and apparatus for use in connection therewith.

The particular illustrative application of the invention hereinafter described, is especially concerned with the manufacture of ice in the form of individual small blocks or multiple units thereof and is designed to enable these to be economically and automatically produced in large volume. Furthermore, the apparatus is contrived to be simple and durable in construction, rapid and efficient in action and capable of withstanding the exacting conditions of commercial use.

These and other objects which will be apparent or described may best be appreciated by reference to the accompanying drawings in which.

The apparatus in general comprises a tank containing a liquid to be frozen, a revoluble cylinder partially immersed in the liquid in the tank and containing a refrigerating medium, a belt or apron passing about this cylinder and having slots or openings therein extending therethrough to form with the peripheral wall of the cylinder a plurality of pockets or molds on this wall into which the liquid flows and within which it is solidified by transfer of heat through such wall, and mechanism for disengaging the frozen blocks from the cylinder wall and ejecting them from the pockets in the belt or apron. The cylinder and belt may be operated by a continuous advance and the various other mechanisms or parts synchronize therewith. Suitable conveyers may conduct the ejected blocks from the mechanism. Thus, the ice in freezing on the cylinder, forms about and interlocks with the belt or apron, which then serves as a medium for removing the ice from the freezing surface. This operation is more fully pointed out hereinafter.

The tank

The tank 20 may be constructed in any suitable manner but, in the form shown, it comprises a cylindrical bottom wall 21, upright side and end walls 22 and 23 respectively and a top wall 24, the whole providing a substantially complete enclosure for the operating mechanism. An inlet pipe as 25 (Fig 1) communicates with the interior of the tank and is connected to a source of supply of water or other liquid to be frozen. Suitable means such as a float valve 25a may be provided to control the admission of this liquid and to maintain a constant level within the tank. The walls of the tank may form supports for the mechanism within and are preferably well insulated as at 26 to prevent as far as possible the conduction of heat therethrough. A suitable base or support (not shown) may be provided for the tank.

The cylinder construction

Figure 1:
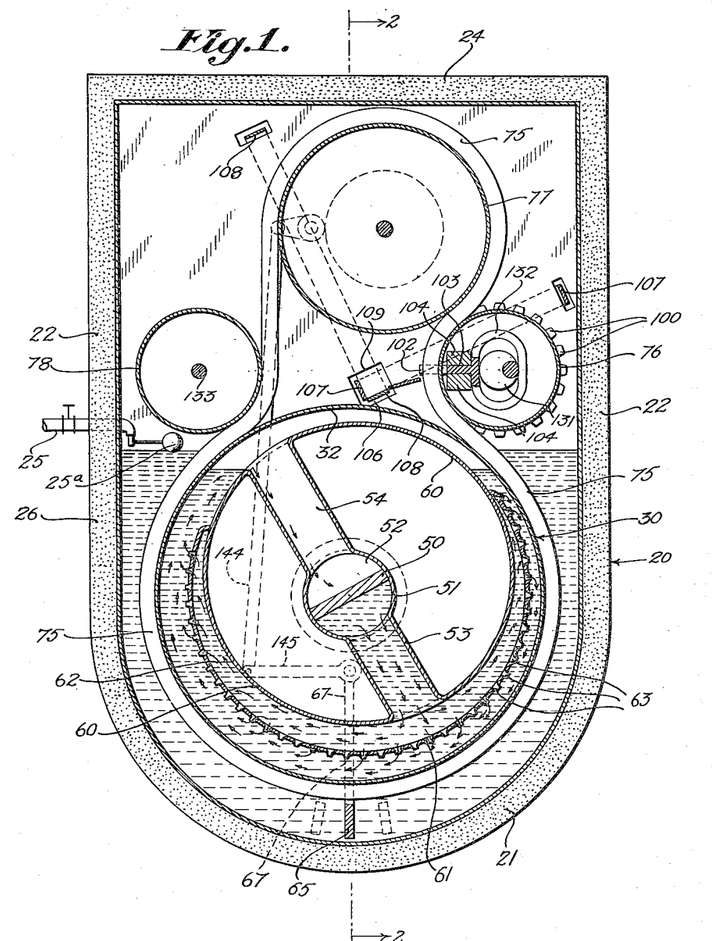
Fig. 1 is a sectional view substantially on the line 1—1 of Fig. 2.
Figure 2:
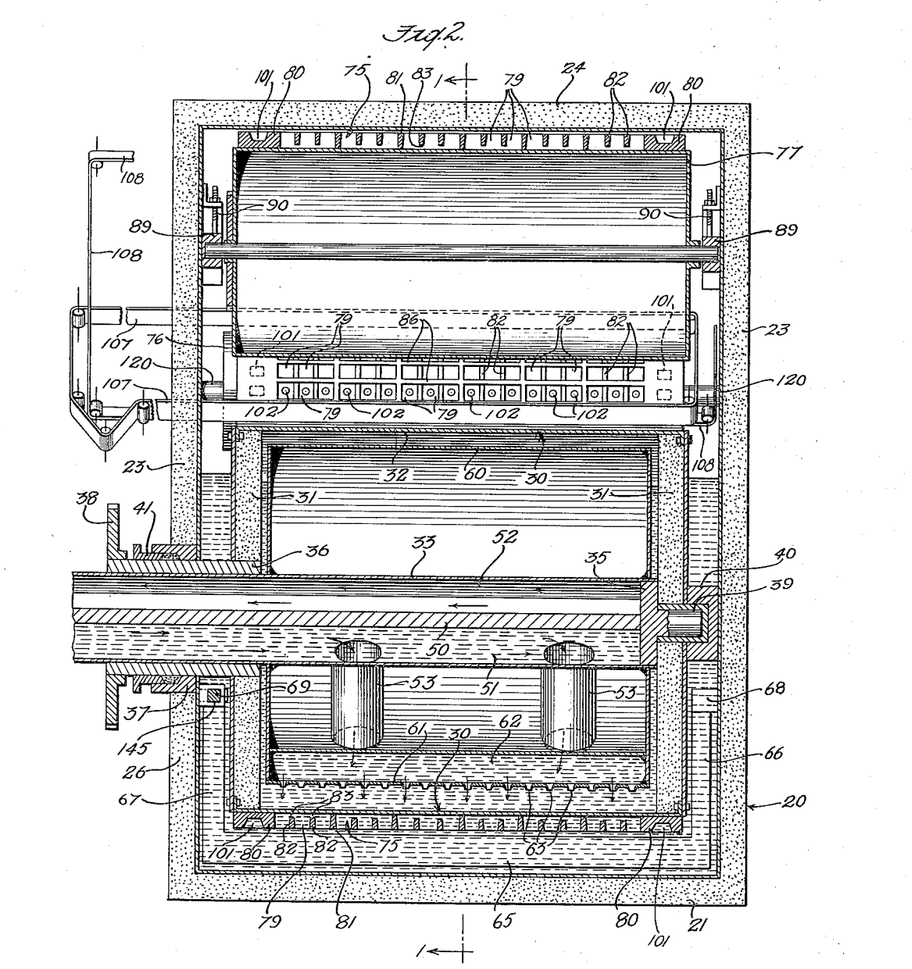
Fig. 2 is a sectional view substantially on the line 2—2 of Fig. 1.

Referring to Figs. 1 and 2. Within the tank 20 there is revolubly mounted a hollow cylinder 30 to contain a refrigerating medium and upon the outer periphery of this the ice is frozen by transfer of heat through the cylinder wall. This cylinder comprises end bells or heads 31 preferably heavily insulated, and relatively thin but substantially rigid peripheral wall 32 of metal or other substance having good heat conducting qualities. A fixed hollow shaft as 33 extends substantially axially through the cylinder and one end thereof passes out through one wall of the tank 20 as shown in the left of Fig. 2. The opposite end of this shaft is closed as at 35 by a plug or other suitable means. The end bell 31 at the left (Fig. 2) is secured to a revoluble hollow shaft 36 fitting about the fixed shaft 33 and projecting through a bearing as 37 in the corresponding end wall 23 of the tank. On this shaft 36 outside the tank is mounted a driving gear as 38 and this is driven through suitable gearing (not shown) from a convenient source of power supply. In the opposite end bell at the right of Fig. 2, is provided a supporting shaft 39 which is revoluble in a bearing 40 secured by any suitable means on the inner face of the corresponding end wall of the tank. Suitable glands, stuffing boxes or packing as 41 may be provided where needed to prevent the passage of liquid through the various bearings and connections.

Within the hollow shaft 33 and extending longitudinally thereof, is a diaphragm or partition 50 which divides the interior of this shaft into two compartments, the compartment 51 forming an inlet pipe for the supply of refrigerating medium, and the compartment 52 forming an outlet pipe therefor.

Within the cylinder 30 is an inner cylinder 60 which is stationarily mounted on the fixed shaft 33 with its axis eccentric to this shaft and the cylinder 30. By reference particularly to Fig. 1, it will be seen that the short inlet and outlet pipes 53 and 54 lead from the compartments or pipes 51 and 52 respectively to conduct the refrigerating medium to and from the space outside this cylinder 60. A perforated sheet as 61 partially envelopes the cylinder 60 and is spaced therefrom except at portions of its margins to form a manifold 62 into which the brine or other refrigerating medium enters from the pipe 53 and from whence it is sprayed through the perforations or nozzles 63 in the sheet upon the interior surface of a portion of the cylinder 30. In the tank 20 below the cylinder 30, is an oscillating paddle 65 for agitating the liquid within the tank. This paddle is supported by arms 66 and 67 respectively pivoted at 68 and 69 on the end walls of the tank. The paddle is preferably kept in oscillation while the apparatus is in operation so that the water or other liquid within the tank is moved gently to and fro. The rate of oscillation of the paddle is preferably fixed at approximately the natural wave period of the liquid in the tank, so that ample motion is obtained with slight power consumption. The driving mechanism for this paddle will be presently described.

The belt or apron

Figure 6:
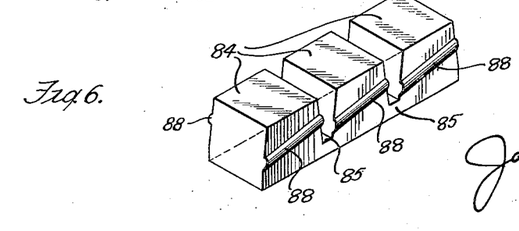
Fig. 6 is a detail view.

A preferably thick flexible belt or apron as 75, of rubber or other suitable material, is partially wrapped about the periphery of the cylinder 30 and the idler rolls 76, 77 and 78. This belt is provided with a series of transversely extending openings 79 which form with the peripheral wall 32 of the cylinder 30 a series of pockets or molds into which the liquid in the tank 20 flows, and within which such liquid is frozen by heat exchange through such wall. The marginal portions 80 (Fig. 2) of this belt outside the openings 79 serve to provide adequate strength to take care of the longitudinal strain on the belt. The openings or molds 79 may be subdivided by transverse partitions as 81 and 82 so that a plurality of relatively small blocks, as for example cubes, of ice may be produced in each such opening or mold. These partitions are preferably integral with the body of the belt and the spacing therebetween, as in the case of the width of the openings, will depend on the size of blocks desired.

Where individual blocks are to be manufactured, all of the partitions will be of substantially the same depth as the thickness of the belt. In the construction shown, the belt is intended to provide the blocks or cubes in multiple units, as shown in Fig. 6, in which the blocks or cubes 84 are united by webs 85. This is accomplished by having intermediate partitions such as 82 shallower than the end partitions 81 and terminating at an interval as 83 from the peripheral wall of the cylinder so that the water will fill these intervals and form the connecting webs. The slots between the blocks of the unit are formed by the partitions 82. The openings in the belt may extend therethrough or may be partially or fully closed by a membrane on the side away from the freezing surface, and in the latter case, this membrane would preferably be elastic enough to allow for the expansion in volume which takes place during the freezing of certain liquids.

Figure 3:
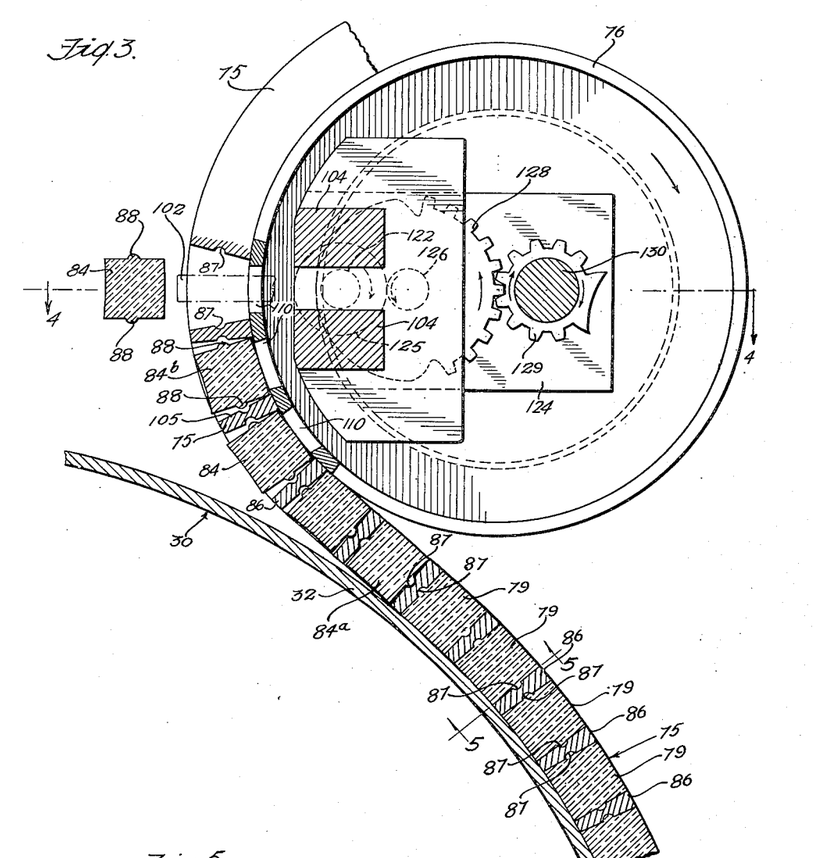
Fig. 3 is an enlarged sectional view substantially on the line 3—3 of Fig. 4.
Figure 5:
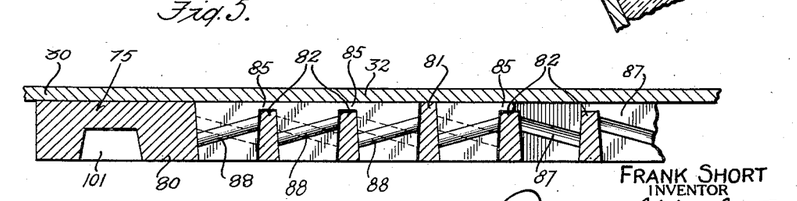
Fig. 5. is an enlarged sectional view substantially on the line 5—5 of Fig. 3.

In the particular belt illustrated there will be six units formed in each opening or mold, or a total of 18 blocks or cubes. This number will vary in different appparatus depending on the width of the belt and the size of block desired. Likewise, each unit may consist of more or less blocks. The partitions as 86 between the openings or molds 79 are best shown in Fig. 3. Grooves as 87 may be provided in the faces of these partitions to form ribs as 88 (Fig. 6) on the side faces of the blocks of ice for the purpose which will be presently explained. The grooves on opposite sides of each partition may be at oppositely sloping angles (Fig. 5) so that when the multiple units or individual blocks are packed side by side in a carton, the ribs 88 on opposing faces of adjoining blocks will cross each other, touching only in the middle or at their point of intersection and thus preventing the side surfaces from adhering except at these points. Blocks so formed may be readily separated even though they become bonded at the points of contact while in storage or shipment and this separation takes place without damage to the apppearance of the blocks.

Viewing the construction as in Fig. 1, the cylinder 30 rotates in a counter-clockwise direction and the belt 75 moves likewise. The idler 76 rotates in a clockwise direction as does the idler 78, whereas the idler 77 rotates in a counter-clockwise direction. It will be evident that when the belt leaves the cylinder 60 and passes upwardly about the idler 76 its curvature is reversed. The belt then passes from this idler roll upwardly over the top of the idler 77 and thence downwardly under the idler 78 into contact with the cylinder. The idlers 76, 77 and 78 may be mounted in suitable bearings as 89 on the inside faces of the end walls 23. The bearings for the idler 77 are preferably adjustable as indicated at 90 to compensate for stretch in the belt. The belt 75 is, in the embodiment shown, frictionally driven by the cylinder 30.

The ice ejecting mechanism

The ice ejecting mechanism operates in conjunction with the idler 76 which is preferably provided with teeth as 100 on its opposite margins to act as a sprocket, the teeth entering corresponding reenforced indentations or slots as 101 (Fig. 2) in the corresponding margins of the belt 75. Thus the idler is positively driven by the belt. The actual ejection of the blocks of ice from the molds or openings in the belt is performed by a row of plungers as 102 (Figs. 3 and 4) which are formed on the margin of a sliding T-shaped plate 103 (Figs. 1 and 4) operating between guides as 104. Preferably the number of these plungers corresponds with the number of blocks in one of the openings or molds 79, so that all of the blocks in one such opening will be simultaneously ejected at each advance of the plungers.

It has been found in practice that the blocks of ice cling tenaciously to the freezing surface. Referring to Fig. 3, the blocks in each mold are stripped from the cylinder by the belt 75 when this belt leaves the cylinder. The row of blocks 84a have just been broken or detached from the freezing surface and are starting their upward travel toward the ejecting mechanism. The openings in the belt in the portion of such belt upon the periphery of the cylinder 30 may be slightly narrower at the bottom or inside than at the top or outside so that when the belt starts to leave the cylinder these sides act to grip the block therebetween sufficiently to enable the belt to strip the block from the cylinder. Another way to accomplish this is by the use of the grooves 87 in the opposing walls of the opening which will engage the corresponding ribs 88 formed on the opposing faces of the ice blocks. Such grooves may also be used to augment the hold of the walls where these walls and the blocks are tapering inwardly in the manner described.

When the belt comes in contact with the idler roll 76 or the stripping drum as it will hereinafter be referred to, it will be seen that the reversing of the curvature of the belt and the smaller radius of this drum causes the mold openings to open up substantially as indicated at 105 and to thus practically release the row of blocks as at 84b therefrom. The same condition exists when this row of blocks is brought to the position opposite the row of plungers 102. Thus each row of blocks is easily ejected by these plungers. This opening up of the molds is permitted by the elasticity of the material in the belt. It will be evident that the stripping drum 76 not only acts to pull the belt relatively abruptly from the cylinder and thus effectually strips the ice blocks from the periphery thereof, but it also functions to facilitate the ejection of such ice blocks by the plungers 102. The function of the idler 77 is obvious. The idler 78 acts to bring the belt firmly in contact with the cylinder 30 prior to the belt entering the water or other liquid to be frozen.

The stripping drum 76 is a hollow cylinder having a series of longitudinally extending circumferentially spaced rows of openings 110 in the periphery thereof, the rows having substantially the same circumferential spacing as the mold openings 75 in the belt, so that one row will register with each mold brought into discharge position. The openings 110 in each row likewise have substantially the same spacing as the individual cube molds between the transverse partitions 81 or 82 in the belt, and are also arranged to register with such mold openings in the position mentioned. Where the openings in the belt are fully closed by a membrane as described, the plungers 102 would merely stretch this membrane in the ejection of the frozen blocks.

A conveyer 106 acts to receive the blocks discharged by the plungers 102 and to conduct them from the machine. Any suitable form of conveyer might be used for this purpose, but the conveyer shown consists of two belts 107 and 108 which operate at substantially a right angle to each other, and during a portion of their travel run substantially edge to edge, as shown immediately above the cylinder 30 in Fig. 1, to form a trough into which the blocks fall, the two belts traveling at the same speed. As this particular conveyer construction forms no part of the present invention and as such is well known in the conveyer art, no description in detail is deemed necessary. The operative or carrying portions of these belts pass through the tank wall at 109.

The operating mechanism

Referring to Fig. 2, the cylinder 30 and the belt 75, as has been described, are driven by the gear 38 on the shaft 36 and this gear 38 is driven from a source of power (not shown) through suitable gearing or other mechanism for the purpose. Such mechanism should be adjusted to rotate the cylinder at the proper speed for any given condition of brine and water temperature so that a full cube will be frozen from the time one of the molds enters the water beneath the idler 78 until this mold emerges from the water beneath the stripping drum 76. The rotation of the cylinder and of the belt is preferably continuous although a step by step advance may be used.

Figure 4:
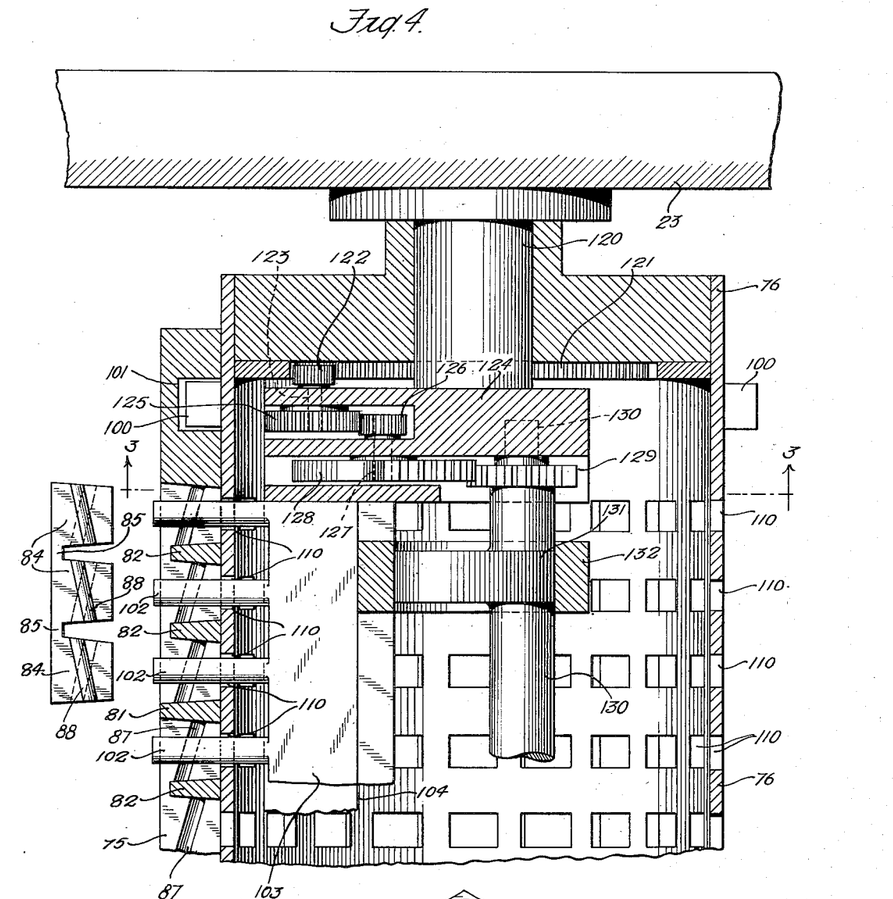
Fig. 4 is an enlarged sectional view substantially on the line 4—4 of Fig. 3.

Referring to Fig. 4, it will be seen that the stripping drum 76 is revolubly mounted on oppositely disposed stud shafts 120 which are secured to the corresponding end walls 23 of the tank in any suitable manner. Referring to the upper portion of Fig. 4, an internal gear 121 is secured to the end of the drum 76 and revoluble therewith. A pinion 122 meshes with the gear 121 and is mounted upon a short shaft 123 supported in a bracket 124 fixed on the shaft 120. A similar bracket 124 (not shown) is mounted in the same manner on the corresponding stud shaft 120 at the opposite end of the stripping drum 76. On the opposite end of this shaft 123 is secured a gear 125 which is in mesh with a gear 126 on a short shaft 127. At the opposite end of the shaft 127 is secured a mutilated gear 128 meshing with a Geneva lock gear 129 on a long shaft 130 mounted at its ends in suitable bearings in the oppositely disposed brackets 124. Fixed on the shaft 130 are two or more eccentrics 131 which operate the plate 103 through the medium of corresponding Scotch yokes 132. This system of gearing causes the plungers 102 to be forced outwardly through each longitudinal row of openings 110 in the drum 76 successively as such openings are being advanced by the belt. The gear 128 rotates continuously but it imparts an intermittent rotation to the gear 129.

The gear 129 makes a complete revolution and thus reciprocates the plungers during each revolution of the gear 128, but this gear 129 is stationary during the interval between the time that one block has been ejected and the next row of openings 110 is being moved opposite the plungers. This intermittent action is provided by the mutilated portion of the periphery of the gear 128 and the blank portion of the gear 129. To insure smoothness of action of the plate 103 carrying the plungers 102, it is advisable to have one of the eccentrics 131 and a cooperating yoke 132 near each end of the operating shaft 130, only one being shown in the drawing for the purpose of illustration. The agitator or paddle 65 may be oscillated in various ways but in the present instance it is driven from the shaft of the idler 77 through suitable gearing and connections to obtain approximately the proper speed.

The operation

In the operation of the apparatus shown, the cylinder 30 is preferably rotated continuously at a rate which will cause the ice cubes or other blocks to be completely formed and fill the molds from the time that each mold is filled with water until such mold is lifted from the water preparatory to being taken to the discharging mechanism. The time will depend on the thickness of the belt and also vary somewhat in accordance with the temperature of the brine in the cylinder and the water in the tank. The proper speed can best be determined after the apparatus has been in operation a short time and in the same way, the most advantageous rate of flow of the brine into the cylinder.

The brine enters the cylinder through the pipe or passage 51 in the fixed shaft 33, passing through the branch pipes 53 into the manifold and then being projected by the perforations or nozzles 63 upon or toward the inner surface of the cylinder 30. Referring to Fig. 1, the cylinder 30 rotates in a counter-clockwise direction whereas the brine flows in a clockwise direction, substantially as indicated by the arrows, after being directed by the nozzles toward the cylinder at a relatively high velocity. It then flows toward the upper ends of the discharge pipes 54 from which it enters the outlet pipe or passage 52 in the shaft 53.

As the cross section of the brine path increases toward the outlet, the velocity of the brine decreases, and for the last few inches before the brine passes into the pipe 54 there are no direct jets of brine impinging on the cylinder. Thus, the first layers of ice congealed on the periphery of the cylinder are frozen both at higher temperature and with lower heat transfer rate, both of these factors tending to produce clear ice. As the ice grows thicker the insulating action of the ice layer is sufficient to shield the new ice from the effects of direct brine jets inside the cylinder. The gentle to and fro motion produced in the water by the agitator 65 serves to wash away any foreign matter from the ice surfaces being congealed and otherwise aids in obtaining clear ice.

As each of the filled molds leaves the water, the ice therein is quite firmly attached to the cylinder wall. The stripper drum 76 now acts to draw or peel the belt rather abruptly from this wall causing the ice in the successive molds to be detached or broken therefrom. The coldest layer of ice in the block or cubes is naturally next to the freezing surface and this is the most brittle so that the break will generally occur at or near this surface. The detached blocks of ice are now carried in the belt partially about the periphery of the stripping drum and each mold is successively brought opposite the plungers 102. At this time the plungers are forced outwardly by the plate 103 through the action of the eccentrics 131 on the corresponding Scotch yokes 132. The movement of the belt is sufficiently slow to permit the plungers to eject the blocks from the mold cavities while such belt continues to advance. The opening up of the mold cavities in the manner described, permits the block to be easily ejected therefrom. The empty molds are carried over the idler 77 and under the idler 78 until they again enter the water in the tank where they are filled and the operation is repeated. Thus it will be evident that blocks of ice are continuously and simultaneously being formed and discharged as long as the apparatus is in operation.

As has already been mentioned, the ice in the molds may be formed in individual cubes or in units composed of a number of cubes connected by a web. For local consumption the individual cubes are generally preferred but for packaging or storing, it is advisable to form the cubes into multiple units such as the three cube unit shown in Fig. 6. Such units are more easily handled and placed in a carton and also they are kept separated lengthwise by the web. When a number of units are placed side by side the ribs 88 on opposing faces of the units prevent any material welding of the surfaces. The form of the blocks will depend entirely on the shape of the mold cavities and blocks of different forms or sizes may be produced in different portions of the belt or even the individual blocks in a single mold may differ, depending on the form and arrangement of the walls or partitions in such mold.

Considering the apparatus as a whole, it will be evident that it is simple and durable in construction, rapid and efficient in action and capable of withstanding the exacting conditions of commercial use. The manufacturing of ice in this manner is exceedingly economical and the production of small blocks or cubes will continue indefinitely without requiring any manual labor. The entire apparatus is well insulated and enclosed so that there is very little loss by transfer of heat with the surrounding atmosphere.

The term "ice" is used in this application in its broad sense to include any frozen liquid.

It will be seen that this invention comprises an art and an apparatus, both of an essentially practical nature in which the several objects referred to are attained.

As the art herein described may be carried out in various ways and as the apparatus may be materially changed without departing from the scope of the invention, it is to be understood that all matter herein set forth or shown in the accompanying drawings is to be interpreted as illustrative and not in a limiting sense.

I claim:

1. In apparatus of the character described, in combination, a revoluble cylinder containing a refrigerating medium, means for supplying liquid to be frozen to said cylinder and a belt partially wrapped about said cylinder and having openings extending therethrough to form with the periphery of the cylinder molds adapted to receive said liquid and within which said liquid is frozen, and means for applying said belt to said cylinder and for removing said belt and frozen liquid therefrom as said cylinder continuously rotates.

2. In apparatus of the character described, in combination, a tank to contain a liquid to be frozen, a revoluble cylinder partially immersed in said liquid and containing a refrigerating medium, a belt partially wrapped about said cylinder and having openings extending therethrough to form with the periphery of the cylinder molds to admit said liquid and within which said liquid is frozen by heat exchange through the cylinder wall, and means for relatively moving the belt and the cylinder after the liquid is frozen in said molds to loosen and disengage the frozen liquid from said wall.

3. In apparatus of the character described, in combination, a tank to contain a liquid to be frozen, a revoluble cylinder partially immersed in said liquid and containing a refrigerating medium, a belt partially wrapped about said cylinder and having openings extending therethrough to form with the periphery of the cylinder molds to admit said liquid and within which said liquid is frozen by heat exchange through the cylinder wall, and means for drawing the belt away from the cylinder wall at a sharp angle as the ice fills the molds therein to cause said ice to be detached and removed from said wall.

4. In apparatus of the character described, in combination, a tank to contain a liquid to be frozen, a revoluble cylinder partially immersed in said liquid and containing a refrigerating medium, a belt partially wrapped about said cylinder and having openings extending therethrough to form with the periphery of the cylinder molds to admit said liquid and within which said liquid is frozen by heat exchange through the cylinder wall, and a stripper drum acting to progressively pull the belt away from the cylinder wall as the molds therein are filled with ice to cause said ice to be detached from said wall.

5. In apparatus of the character described, in combination, a tank to contain a liquid to be frozen, a revoluble cylinder partially immersed in said liquid and containing a refrigerating medium, and a belt partially wrapped about said cylinder and having openings extending therethrough to form with the periphery of the cylinder molds to admit said liquid and within which said liquid is frozen by heat exchange through the cylinder wall, the blocks of ice formed in said molds being loosened and disengaged from the cylinder wall by a peeling action produced by movement of the belt away from the cylinder.

6. In apparatus of the character described, in combination, a tank to contain a liquid to be frozen, a hollow cylinder partially immersed in said liquid and containing a refrigerating medium, an apron partially wrapped about said cylinder and having openings extending therethrough to form with the periphery of the cylinder molds adapted to be successively filled with said liquid and within which the liquid is frozen by heat exchange through the cylinder wall, the ice in the molds being torn from the surface of the cylinder by withdrawal of the apron therefrom and remaining in said openings until subsequently discharged therefrom.

7. In apparatus of the character described, in combination, a tank to contain a liquid to be frozen, a revoluble cylinder partially immersed in said liquid and containing refrigerating media, a belt partially wrapped about said cylinder and having openings extending therethrough to form with the periphery of the cylinder molds to admit said liquid and within which said liquid is frozen by heat exchange through the cylinder wall, means for continuously moving portions of the belt away from the cylinder wall after the liquid is frozen in the molds therein to disengage said frozen liquid from said wall as said cylinder continuously rotates, and means for ejecting the disengaged frozen liquid from the openings in the belt.

8. In apparatus of the character described, in combination, a tank to contain a liquid to be frozen, a continuous revolving cylinder partially immersed in said liquid and containing refrigerating media, an idler roll, a belt enveloping said cylinder and said roll and revoluble therewith, and openings extending through said belt and forming with the periphery of the cylinder molds to admit said liquid and within which said liquid is frozen by heat exchange through the cylinder wall, the blocks of ice formed in said molds being torn from the cylinder wall by said belt as the portions of the belt containing said blocks move away from said wall.

9. In apparatus of the character described, in combination, a tank to contain a liquid to be frozen, a revoluble cylinder partially immersed in said liquid and containing refrigerating media, a belt enveloping said cylinder and revoluble therewith, openings extending through said belt to form with the periphery of the cylinder molds to admit said liquid and within which said liquid is frozen by heat exchange through the cylinder wall, means for continuously moving the belt away from the cylinder wall substantially at the intersection of the cylinder and the liquid, as the liquid is frozen in the molds to disengage the frozen liquid therein from said cylinder, means movable through the molds to eject the frozen liquid therefrom, and a conveyer for removing the ejected frozen liquid.

10. In apparatus of the character described, in combination, a heat exchange member, a flexible covering therefor having openings extending therethrough to expose portions of the surface of the member thereunder and adapted to form said surface molds in which liquid is frozen by exchange of heat with said member, and means for removing the covering from said member to cause the frozen liquid in said molds to be detached from the surface of the member.

11. In apparatus of the character described, in combination, a heat exchange member, and a covering therefor having openings extending therethrough to expose portions of the surface of the member and adapted to form with said surface molds in which liquid is frozen by exchange of heat with said member, the frozen liquid being torn from the surface of the member by forcibly removing the covering therefrom.

12. In apparatus of the character described, in combination, a heat exchange member, a covering therefor having openings extending therethrough to expose portions of the surface of the member and adapted to form with said surface molds in which liquid is frozen by exchange of heat with said member, the frozen liquid being torn from the surface of the member by peeling the covering therefrom, and indentations in the walls of said openings to form projections on the frozen liquid therein to aid in retaining said frozen liquid within the openings during said peeling operation.

13. In apparatus of the character described, in combination, a revoluble heat exchange cylinder, a belt revoluble with said cylinder and having openings extending therethrough to form with the wall of the cylinder molds to admit a liquid and within which said liquid is frozen, and means for continuously pulling the belt from the cylinder to detach the blocks of frozen liquid therefrom, and for continuously returning the belt thereto.

14. In apparatus of the character described, in combination, a revoluble heat exchange cylinder, a belt of heat insulating material fitting about and revoluble with said cylinder and having openings extending therethrough to form with the wall of the cylinder molds to admit a liquid and within which said liquid is frozen, and means including a stripper drum for peeling the belt from the cylinder to detach the blocks of frozen liquid from said cylinder.

15. In apparatus of the character described, in combination, a revoluble heat exchange cylinder, an elastic belt revoluble with said cylinder and having openings extending therethrough to form with the wall of the cylinder molds to admit a liquid and within which said liquid is frozen, and means including a revoluble stripper drum for peeling the belt from the cylinder to detach the ice blocks from said cylinder, the stripper drum also acting to alter the shape of the openings in the belt to facilitate the removal of the blocks therefrom.

16. In apparatus of the character described, in combination, a revoluble heat exchange cylinder, an elastic belt fitting about and revoluble with said cylinder and having openings extending therethrough to form with the wall of the cylinder molds to admit a liquid and within which said liquid is frozen, means including a revoluble drum for peeling the belt from the cylinder to detach the ice blocks from said cylinder, the drum acting to temporarily expand the openings in the belt, and plungers movable through the expanded openings to eject the ice therefrom.

17. In apparatus of the character described, in combination, a continuously rotating heat exchange cylinder, a belt passing over and rotating with said cylinder, openings in said belt extending therethrough to form with the periphery of the cylinder in contact therewith molds to admit a liquid and within which said liquid is frozen, means for guiding the belt away from the cylinder after the liquid is frozen in the molds, and plungers movable in synchronism with the belt to eject the ice from said openings as the belt is moved thereby.

18. In apparatus of the character described, in combination, a hollow revoluble heat exchange cylinder, a stationary cylinder within said revoluble cylinder and spaced therefrom, a jet manifold on the outer face of said inner cylinder, and means for conducting refrigerating media to said manifold.

19. In apparatus of the character described, in combination, a stationary hollow shaft forming inlet and outlet brine supply pipes, a hollow cylinder revoluble on said shaft, an inner cylinder fixed on said shaft and spaced from the revoluble cylinder, a jet manifold about the periphery of said inner cylinder, and pipes connecting said inlet and outlet pipes respectively with said manifold and the space between said cylinders outside said manifold.

20. In apparatus of the character described, in combination, a hollow revoluble cylinder, a stationary cylinder within and spaced from the revoluble cylinder and eccentric thereto, a manifold on the outer face of the inner cylinder, jet nozzles in said manifold, a brine inlet pipe communicating with said manifold, and a brine outlet pipe communicating with the space between said cylinders outside said manifold.

21. In apparatus of the character described, in combination, a hollow shaft, a partition extending longitudinally through said shaft to form inlet and outlet brine pipes therein, a cylinder revoluble on said shaft, a stationary cylinder within said revoluble cylinder and spaced therefrom, a manifold on the outer face of the inner cylinder, jet nozzles in said manifold directed at the inner periphery of the revoluble cylinder, a pipe connecting said inlet pipe with said manifold, and a pipe connecting said outlet pipe with the space between said cylinders outside of said manifold.

22. In apparatus of the character described, in combination, a tank to contain a liquid, a heat exchange cylinder revoluble in the liquid in said tank, removable molds on the periphery of said cylinder to admit said liquid and within which the liquid is frozen by exchange of heat with said cylinder, and a mechanical agitator in said tank to provide a motion to the liquid in the vicinity of said molds, and means for peeling said molds from said cylinder to tear the frozen liquid therefrom.

23. In apparatus of the character described, in combination, a heat exchange member, a covering therefor having openings therein to form with the surface of the member molds in which liquid is frozen by exchange of heat with said member, and indentations in the mold walls to form corresponding projections on the surface of the frozen liquid.

24. In apparatus of the character described, in combination, a heat exchange member having a refrigerated surface, and a detachable mold on said surface having a plurality of openings extending therethrough and forming therewith a series of receptacles adapted to contain a liquid to be frozen by transfer of heat with said heat exchange member, the wall of said mold being provided with one or more indentations to form corresponding elevations on the exterior of the frozen liquid.

25. In apparatus of the class described, in combination, a tank for containing a liquid to be frozen, a revoluble cylinder partially immersed in said liquid, means for supplying a refrigerating medium to the inner wall of said cylinder and for maintaining the level of said refrigerating medium substantially equal to that of the level of the liquid, said means being capable of maintaining a substantial temperature difference between one section of the refrigerating medium and a section separated therefrom; an idler pulley and a belt, said belt passing over said idler pulley and the immersed portion of said cylinder, said belt being rotatable with said cylinder and idler; means interposed between said idler and cylinder for causing said belt to take off from said cylinder at a relatively sharp angle, substantially at the level of said liquid as said cylinder rotates.

26. A method of manufacturing relatively small units of solidified fluid which consists in applying partitioning sections to a freezing surface to form individual compartments therewith, supplying the compartments with fluid to be solidified, automatically pulling the partitioning sections from the freezing surface to remove the solidified fluid therefrom, and automatically flexing the partitioning sections to aid in the ejection of the solidified fluid therefrom.

27. The method of congealing fluid consisting in the steps of supplying said fluid to a refrigerated surface, of positioning means intermediate said fluid and said surface prior to the congealing of the fluid thereon and with which the congealing fluid interlocks, and of automatically removing said means from said intermediate position to remove the congealed fluid interlocked therewith from said surface.

28. The method of congealing fluid consisting in the steps of supplying said fluid to a refrigerated surface, of positioning flexible means intermediate said fluid and said surface prior to the congealing of the fluid thereon and with which the congealing fluid interlocks, of automatically removing said flexible means from said intermediate position to remove the congealed fluid interlocked therewith from said surface, and of automatically flexing said means while in its removed position to aid in the removal of the congealed fluid therefrom.

29. A continuous method of manufacturing ice which consists in applying an endless open meshed belt to a portion of an endless rotatable freezing surface, supplying water to that portion of said freezing surface contacting with said open meshed belt, rotating said freezing surface to cause the endless belt to travel thereabout and to remove from said freezing surface ice frozen thereon and in the interstices of said belt.

30. The method of manufacturing ice which consists in the steps of moving an endless open meshed conveyer around a freezing surface, and with which it contacts over a limited area, of moving the freezing surface so that the contacting areas are at all times stationary with respect to each other, of supplying water to that part of the freezing surface contacting with the conveyer to cause ice to form thereon and interlock with said conveyer whereby as that portion of said conveyer in contact with said surface leaves said surface it peels the ice therefrom.

31. The method of manufacturing ice which consists in simultaneously applying water and an open meshed intermediate member to a freezing surface, and automatically removing said intermediate member from said surface to peel the ice interlocked therewith from said freezing surface.

32. Apparatus of the character described, in combination, an endless rotatable freezing surface, an open meshed belt encompassing said freezing surface, the internal periphery of said belt being greater than the external periphery of the freezing surface and contacting with an area thereof, means for imparting rotation to said freezing surface to cause the belt to travel thereabout, and means for supplying water to that area of said freezing surface contacted by said belt, whereby ice forming on said surface interlocks with said open meshed belt.

33. In apparatus of the class described, in combination, a freezing surface, means for supplying water to said freezing surface, means intermediate said freezing surface and water and removable therefrom, and means for automatically removing said last named means from said intermediate position to peel the ice from said freezing surface.

34. Mechanism for freezing liquid into frozen shapes, comprising, in combination, a continuously revolvable cylinder, an endless flexible belt passing over said cylinder and having holes formed therein, the side walls of which are formed by said belt, said holes being adapted to receive liquid to be frozen and mold the frozen liquid formed by the freezing of the liquid, means for causing said flexible belt to travel away from said cylinder, and means for removing the frozen liquid from said holes while the flexible belt is in motion.

35. Apparatus for freezing relatively small ice shapes comprising refrigerated freezing means, cavity containing means having cavities for receiving liquid to be frozen, means for relatively moving said cavity containing means and said refrigerating freezing means into heat exchanging stationary relationship, for maintaining said relationship and subsequently for stripping said cavity containing means from said refrigerated freezing means, and means for supplying said cavities with liquid to be frozen while said cavity containing means and said refrigerated freezing means are in said stationary relationship whereby the liquid is frozen in said cavities.

36. Apparatus for freezing relatively small ice shapes comprising refrigerated freezing means, cavity containing means having cavities for receiving liquid to be frozen, means for relatively moving said cavity containing means and said refrigerated freezing means to bring successive portions of said cavity containing means into heat exchanging stationary relationship with said refrigerated freezing means and simultaneously to remove successive preceding portions of said cavity containing means from said relationship without disturbing the stationary relationship of succeeding portions with said refrigerated freezing means, and means for keeping said cavities supplied with liquid to be frozen while said cavity containing means and said refrigerated freezing means are in said stationary relationship whereby the liquid is frozen in said cavities.

37. The process of manufacturing relatively small ice shapes comprising the steps of continuously moving successive portions of an apron, having cavities for receiving water, into heat exchanging relationship with a freezing area, simultaneously supplying said cavities with water to be frozen and maintaining said relationship, and simultaneously removing successive preceding portions of said apron from said freezing area to remove the ice therefrom.

38. The process of manufacturing relatively small ice shapes comprising the steps of supplying a traveling freezing surface with liquid to be frozen, of continuously moving successive portions of a perforate apron into non-sliding contact with said traveling freezing surface and maintaining said contact for a desired length of time, of simultaneously continuously removing successive preceding portions of said perforate apron from contact with said freezing surface to remove the ice therefrom, and of subsequently removing the ice from said perforate apron.

FRANK SHORT.